United States Patent [19]

Beutel

[11] 4,109,312

[45] Aug. 22, 1978

[54] METHOD AND APPARATUS FOR MEASURING AND INDICATING THE UNBALANCE OF A ROTOR

[75] Inventor: Rudolf Beutel, Traisa, Fed. Rep. of Germany

[73] Assignee: Firma Carl Schenk AG, Darmstadt, Fed. Rep. of Germany

[21] Appl. No.: 785,918

[22] Filed: Apr. 8, 1977

Related U.S. Application Data

[63] Continuation-in-part of Ser. No. 644,453, Dec. 29, 1975, abandoned, which is a continuation-in-part of Ser. No. 547,345, Feb. 5, 1975, abandoned.

[30] Foreign Application Priority Data

Feb. 7, 1974 [DE] Fed. Rep. of Germany ....... 2405764

[51] Int. Cl.[2] ........................ G01M 1/22; G06F 15/20

[52] U.S. Cl. ...................................... 364/508; 73/462; 364/550

[58] Field of Search .................. 73/462, 71.4; 364/508

[56] References Cited

U.S. PATENT DOCUMENTS

| | | | |
|---|---|---|---|
| 3,443,440 | 5/1969 | Porter | 73/462 |
| 3,661,016 | 5/1972 | Dopp | 73/462 |
| 3,681,967 | 8/1972 | Hines et al. | 73/462 |
| 3,774,456 | 11/1973 | Crump | 73/462 |
| 3,939,715 | 2/1976 | Davis | 73/462 |
| 4,015,480 | 4/1977 | Giers | 73/462 |

FOREIGN PATENT DOCUMENTS

| | | | |
|---|---|---|---|
| 2,405,764 | 8/1975 | Fed. Rep. of Germany | 73/462 |
| 979,013 | 1/1965 | United Kingdom | 73/462 |
| 1,362,185 | 7/1974 | United Kingdom | 73/462 |

*Primary Examiner*—Felix D. Gruber

*Attorney, Agent, or Firm*—W. G. Fasse; W. W. Roberts

[57] ABSTRACT

Analog signals representing the unbalance of a rotor in one or more planes extending perpendicularly and across the longitudinal rotational axis of said rotor, are first adapted prior to an analog to digital conversion. The adaptation takes place in response to at least one adaptation value, which is characteristic for the balancing, such as an attenuation, a sensitivity control, an rpm or measuring range selection and the like. The adapted signal is then combined with a reference signal having a frequency corresponding to the rpm of the rotor. The combined signal is subjected to an analog to digital conversion and then digitally displayed. The circuit arrangement for the performance of the signal adaptation, signal combination and signal display includes adaptation circuit means which are responsive to said adaptation value or values. The adaptation circuit means is connected to receive the unbalance information with the correct sign (+ or −). The adaptation circuit means is further connected to digital indicating means to assure the digital display of the originally analog unbalance representing values with their correct dimensions.

14 Claims, 10 Drawing Figures

INDICATOR UNIT 32a
INDICATOR UNIT 32b
INDICATOR UNIT 32c
INDICATOR UNIT 32d
INDICATOR UNIT 32e
DRIVE CIRCUIT
MEMORY
CONSTANT DISPLAY 33
COUNTER 24
DISPLAY SELECTOR SWITCH
CLOCK PULSE G*
CLOCK PULSE GENERATOR 26
DIGITAL OUTPUTS CONTROL CIRCUIT
INTEGRATOR 22
COMPARATOR 25
INPUT DISTRIBUTOR 21
RPM MONITOR
DISCRIM-INATOR
PRINTER
HOLD INPUT

MEASURING SEQUENCE DIAGRAM

PAUSE PULSE DIAGRAM

METHOD AND APPARATUS FOR MEASURING AND INDICATING THE UNBALANCE OF A ROTOR

BACKGROUND OF THE INVENTION

The present application is a continuation-in-part application of application Ser. No. 644,453 filed Dec. 29, 1975, which was a continuation-in-part application of parent application Ser. No. 547,345 filed Feb. 5, 1975 and both now abandoned.

The invention relates to a method and apparatus or rather circuit arrangement for measuring and indicating the unbalance of a rotor. The unbalance may be measured by means of an electro-mechanical measuring transducer, the output signal of which is combined with a reference signal having a frequency corresponding to the rpm of the rotor, the unbalance of which is to be ascertained.

Austrian Pat. No. 208,626 of Apr. 25, 1960 discloses an apparatus for measuring the unbalance of a rotor by means of an oscillation transducer which produces unbalance representing measured values. Such measured values are combined or linked by means of electronic linking networks, which in turn are connected to indicating means provided for each balancing plane. Heretofore, it was customary to indicate the unbalance representing measured value by means of a vector meter as an analog value, for instance, by means of a watt meter vector indicator or a moving coil vector indicator. However, such analog display or indication does not take into account any apparatus constants and adjustment values of the measuring instrument. Hence, it is necessary to subject the indicated value to a mathematical conversion in order to take such apparatus constant and adjustment values into account.

Such constant factors which depend on the apparatus to be tested may, for example, depend on the spring characteristic of the suspension linkage employed in the particular test or the like. Such factors and constants which are inherent in any particular apparatus are also not taken into account when determining the unbalance information, for example, in connection with balancing machines in which the unbalance representing measured values supplied by the oscillation transducer are combined with measured phase reference values by means of a controlled rectification. Similarly, such factors and contants are also not taken into account in balancing machines in which the unbalance representing value has been determined by means of filters tuned to the rpm of the rotor and in which the angular location of the unbalance has been determined by stroboscopic means.

OBJECTS OF THE INVENTION

In view of the above, it is the aim of the invention to achieve the following objects singly or in combination:

to provide an indication of measured unbalance representing values in which all constant factors or values which depend on the particular balancing machine and which have an influence on the balancing are taken into account;

to provide a digital indication of an unbalance representing information, whereby said machine factors or constants are taken into account;

to adjust the unbalance representing values with the machine constant and adjustment values prior to linking or combining the unbalance representing values with reference values;

to assure a definite, unambiguous digital indication of the unbalance representing measured values;

to assure that the measuring ranges of the indicating means do not limit or adversely influence the indication of the measurement;

to assure that the exceeding of a measuring or indication range by any particular measured value will not result in a wrong indication;

to assure that the unbalance measuring will be performed in an rpm range which is suitable for determining the unbalance;

to provide for an automatic mathematical conversion of angular values into a range of 0° to 359°, if such values should happen to fall into a range larger than 360°; and to supply the indicated digital values to a printer.

SUMMARY OF THE INVENTION

According to the invention a method is provided for measuring and indicating the unbalance of a rotor by means of an electromechanical measuring transducer, the signal of which is combined with a reference signal having a frequency corresponding to the rpm of the rotor to be tested. Prior to the combining of the measured unbalance signal and the reference signal, the measured signal is supplied with the correct sign (+ or −) to an adaptation or attennuation circuit, which is responsive to or adjustable by at least one value which is characteristic for the balancing of the rotor. Thereafter, the measured and adapted signal is combined and subjected to an analog to digital conversion so that the signal may be indicated in a digital manner.

The invention is equally useful where the unbalance of a rotor is measured in several planes by means of several measuring transducers, whereby a signal reference signal is employed. In this instance several adaptation circuit means are employed for adapting the measured values to a digital indication or display in response to several values which are characteristic for the balancing operation and which are employed for adjusting the several adapting circuit means. Preferably, the digital to analog conversion is performed in a time multiplex fashion. According to the invention, it is possible to adjust the measured unbalance representing values in a simple manner prior to the signal combination with the reference signal, with regard to the values which represent machine constants and adjustment values or the like. Thus, the possibility of an erroneous indication of such values is avoided. Further, it is an advantage of the invention that it assures that none of the constant values or adjustment values which might influence the measured results can be inadvertently omitted. A still further advantage of the invention is seen in that it assures a definite and unambiguous digital display or indication of the unbalance representing measured values.

According to the invention there is further provided a circuit arrangement for performing the present method, which circuit arrangement comprises circuit means which are adjustable with regard to machine constant and adjustment values such as the measuring range, the balancing radius of the body to be balanced, the range of rotation of the rotor to be balanced in rpm and other machine constant values. The adaptation circuit means are connected to receive the unbalance information representing measured values with the correct sign (+ or −). The adaptation circuit means are further connected to digital indicating means in order to assure the dimensionally correct display of the measured result. According to a specifically suitable embodiment of the adaptation circuit means, there is provided according to the invention for each characteristic constant or adjustment value an adjustable switch. The signals which are derived from the adjustable switches, are then combined and added by logic circuit means for the digital display of the values including the correct position of the decimal point and the display of the dimensions such as milligram (mg), gram (g), kilogram (kg), and degree (°), and values which are without dimensions, for example, indicating a division or a specific division such as by a factor of a thousand.

Further, according to the invention, the digital measured values are stored in one set of memories with their correct sign (+ or −) and the signals which determine the position of the decimal point as well as the dimensions or dimensionless indications are stored in further separate memories. According to the invention a further control signal is produced in response to the exceeding of the instantaneous measuring range by a measured value or a measured value component. Such additional control signal is also displayed on the digital display and such signal is employed for automatically changing the instantaneous measuring range to another measuring range for accommodating the measured signal value or component. Similarly, when a signal or signal component drops below the instantaneous measuring range that fact is also ascertained and displayed on the digital display means. For indicating the size of an unbalance value as well as its angular position on a digital display, the invention suggests that the corresponding angular display shall be suppressed when the unbalance size drops below a predetermined given small value.

It is an advantage of the invention that the machine constant values or other values having an influence may be supplied to the circuit arrangement by the switch means so that these constant values may be directly taken into account for the display. Further, due to the switching of the measuring range, it is assured that the limits of any particular measuring range of the display device do not affect the measuring. In this manner also any impairing of the measuring is avoided. Thus, the exceeding of a measuring range by a measured value will not result in a false indication. This is especially so where according to the invention the machine constant values are automatically taken into account so that even the exceeding of a measuring range by the measured value which may occur unnoticed by the operator will not result in a false indication.

BRIEF FIGURE DESCRIPTION

In order that the invention may be clearly understood, it will now be described, by way of example, with reference to the accompanying drawings, wherein:

FIG. 8 illustrates a time expanded view of substantially one duration of a pause W in FIG. 6 and FIGS. 9 and 10 are detailed circuit drawings of different portions of the control circuit of FIG. 6.

Figure 5:
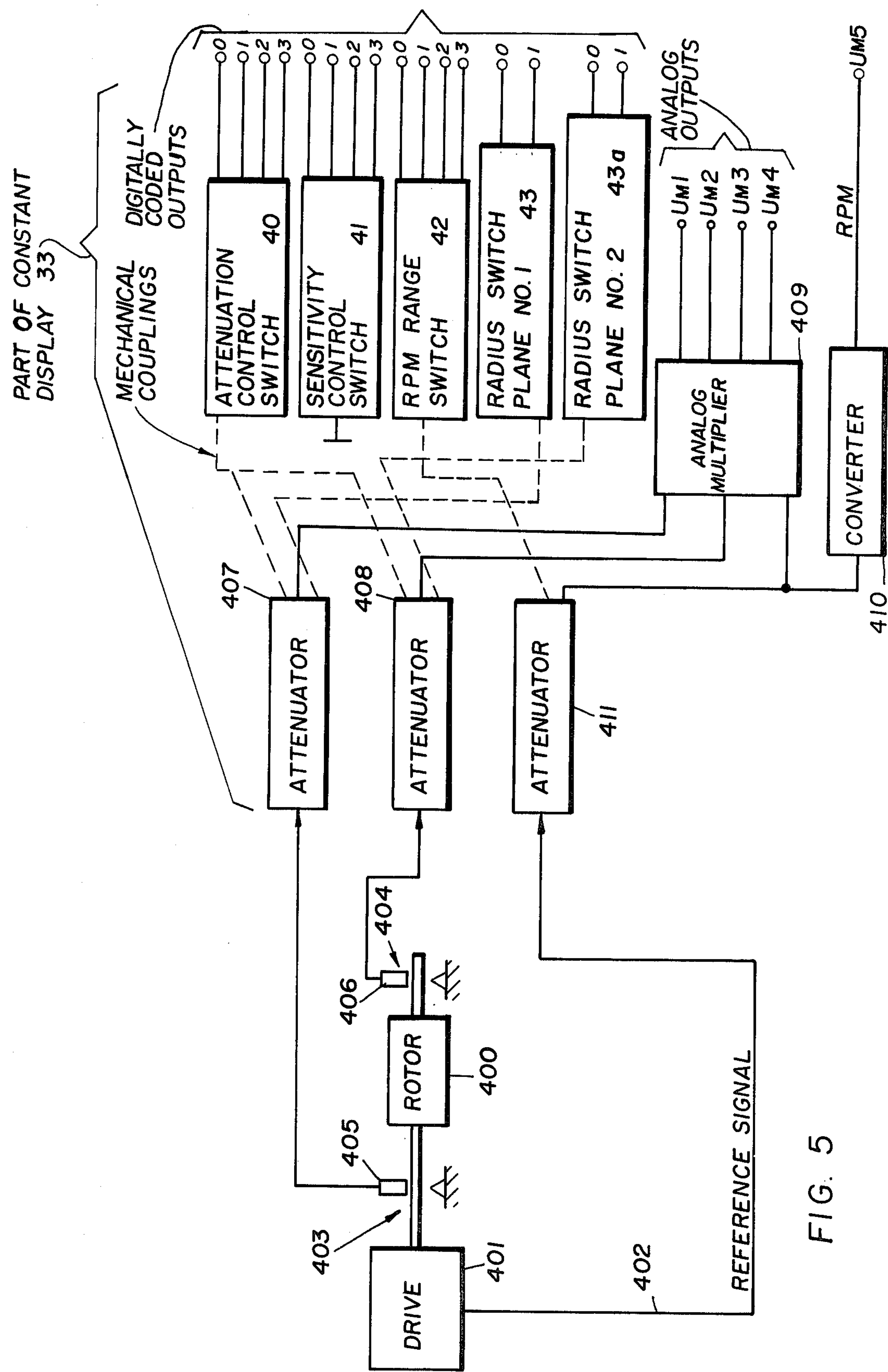
FIG. 5 illustrates a system for deriving the measuring values.

DETAILED DESCRIPTION OF PREFERRED EXAMPLE EMBODIMENTS:

In order to more clearly understand the concept of the invention, reference is first made to FIG. 5 which shows in simplified form an unbalance measuring system for deriving analog values, such as voltages or currents, corresponding to the unbalance of a device, such as a rotor 400 being tested. The rotor 400 is driven by a drive mechanism 401, for example, a motor, and a signal on line 402 which may be coupled to the drive mechanism is a reference signal having a frequency corresponding to the rate of rotation of the rotor 400. In the illustrated embodiment the unbalance of the rotor 400 is measured in two planes, indicated at 403 and 404. An unbalance sensing device 405 of conventional nature is positioned to provided an output signal corresponding to the unbalance in the first plane 403, and a similar sensing device 406 is positioned to provide a signal corresponding to the unbalance in the second plane 404. The signals from the sensing devices 405 and 406 are applied to attenuators 407 and 408 respectively, and the outputs of the attenuators 407 and 408 are connected to an analog multiplier 409. The reference signal from line 402 is also applied to the analog multiplier 409 via attenuator 411.

The analog multiplier 409 combines the reference signal from line 402 with the output signals of the attenuators 407 and 408 to produce analog output signals $U_M$1–$U_M$4, corresponding to the angular position of the unbalance in each plane, and the degree of unbalance. For example, the analog unbalance voltages $U_M$1 and $U_M$2 may correspond to the degree of unbalance in the planes 403 and 404 respectively with the analog signals $U_M$3 and $U_M$4 having voltages corresponding to the annular position of the unbalance. For example, the degree of unbalance may be ascertained from the amplitude of the output signals of the sensors 405, 406, and the angular position of the unbalance may be determined by the phase relationships between the reference signal and the outputs of the sensors. In this case, the analog multiplier 409 may comprise conventional phase detecting circuits for producing the analog output voltages corresponding to the phase displacement of the signals from the pick-ups 405 and 406 with respect to the reference signal. Conventional peak or other amplitude detecting means for producing the analog signals corresponding to the amplitude of the unbalance may be used. Conventional phase detectors and amplitude detectors are, for example, described in U.S. Pat. No. 3,681,978.

The analog multiplier 409 may provide analog output voltages corresponding to the degree of unbalance in *x* and y coordinates. This may be effected in a known manner, for example, by mathematical conversion of the polar coordinate signals above discussed. Alternatively, in order to provide analog signals corresponding to x, y coordinates, the analog multiplier may comprise conventional signal multipliers interconnected to provide the desired output signals in accordance with conventional trigonometric relationships. Such coordinate conversion is well known. The analog multiplier 409 may, if desired, be arranged to be selectively switched to provide either polar or rectangular coordinate outputs. The signals $U_M1$ to $U_M4$ are thus direct voltages representing the unbalance in two planes, with two of these voltages representing the unbalance in one plane and the other two voltages representing the unbalance in the other plane. Depending upon the coordinate system employed, and the quadrant in which the unbalance occurs with regard to the reference, the analog voltages may be either positive or negative. The reference point is defined with regard to the reference signal on line 402. Thus, in the determination of the unbalance of a rotor, the reference on the rotor may be arbitrarily designated and, for example, marked on the rotor so that when the rotor is inserted in the unbalance determining device, the phase of the reference signal bears a determined relationship with the position of the reference point. This is conventional in the determination of an unbalance of a rotor.

A frequency to amplitude converter 410 is also provided for converting the a.c. reference signal to an analog signal $U_M5$, having an amplitude related to the frequency of the reference signal.

Figure 1:
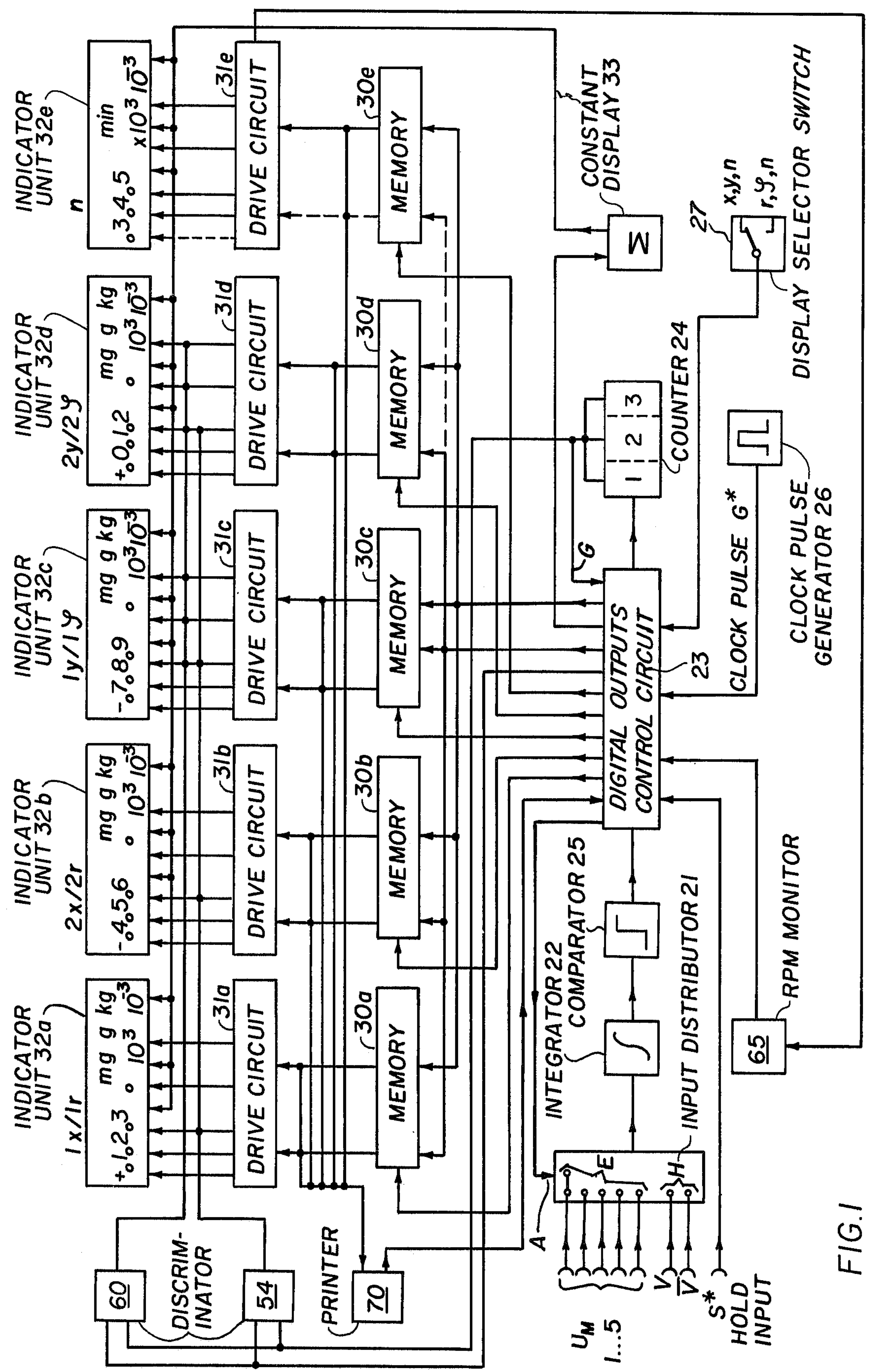
FIG. 1 is a block diagram of a circuit arrangement according to the invention for the digital display of measured unbalance values.
Figure 4:
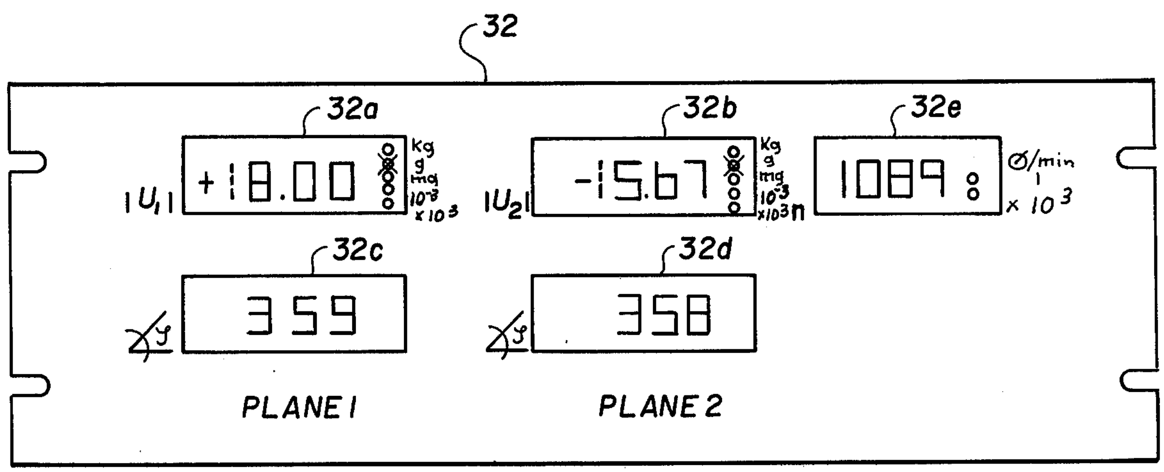
FIG. 4 shows an example of a display panel according to the invention.

FIG. 4 shows a display panel 32 comprising five display units 32a, 32b, 32c, 32d and 32e. These display units are also shown in FIG. 1 and designated with the same reference numerals 32a to 32e. Display unit 32a indicates, for example, the unbalance value U1 in a digital manner. In addition, there are five indicating means, for example light emitting diodes, for the display of the dimension or a range value. There may be separate indicators for indicating milligrams, grams, and kilograms, as well as separate indicators for indicating multiplying factors for the indicating quantity of $10^0$ and $10^3$. The unbalance representing value U1 is measured in a first plane 403 of a rotor 400 to be balanced. The measuring may be accomplished in accordance with the disclosure of Austrian Patent 208,626. Display unit 32c indicated the angle of the unbalance in the first plane of the rotor. Similarly, the display units 32b and 32d display the unbalance value U2 and angle in the second plane of the rotor to be balanced. The cross next to the right-hand edge of the display units 32a and 32b indicates that the display is in grams (g). Display unit 32e indicates the rpm of the rotor directly since the little cross displays that the multiplication is by the factor 1. A further light may be provided on the display unit 32e for indicating that the display number should be multiplied by $10^3$.

FIG. 1 illustrates in block diagram form the circuit arrangement for the digital display of unbalance representing values where the balancing is to take place in two separate planes. Thus, as explained above in connection with FIG. 4, the display unit 32a may, for example, display the x component in the first plane (1x) or the length r of the vector in the first plane (1r). Similarly, display unit 32b may, for example, display the x component in the second plane (2x) or the vector value r in the second plane (2r) after appropriate switch-over to be explained below. Display unit 32c may display the y component in the first plane or the angle for the vector display in the first plane. Similarly, display unit 32d may display the y component in the second plane or the angle for the vector display in the second plane. Display unit 32e indicates the rpm of the rotor to be balanced. Thus, in the example display of FIG. 4, the absolute values U1 and U2 may be vector values with the corresponding angular display. FIG. 1 illustrates an embodiment example which operates on a time multiplex basis for the display. However, the invention is not limited to a time multiplex display.

In order to display the analog measured values in a digital manner, it is necessary to convert a measured analog value into a corresponding digital value. This may, for example, be accomplished in a conventional manner by integrator means, a clock signal generator, a counter, a comparator, and a control device. The example embodiment of FIG. 1 shall serve for the illustration of converting one direct voltage value namelu $U_M1$ into a corresponding digital value. Conversion of the remaining values $U_M2$ to $U_M5$ takes place in the same manner as will be described with reference to $U_M1$. Incidentally, the "M" in $U_M1$ indicates the measured value.

Figure 9:
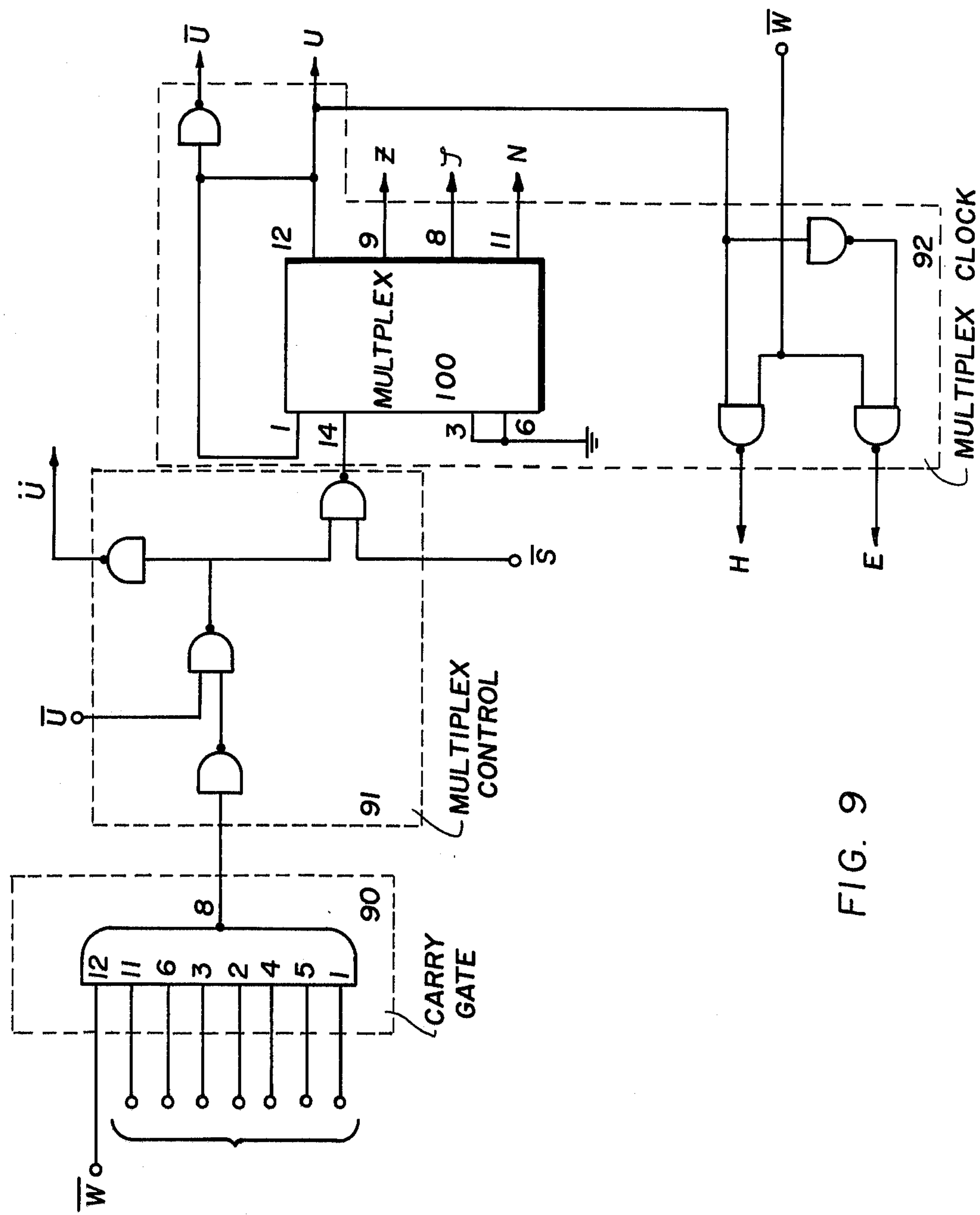
Figure 10:
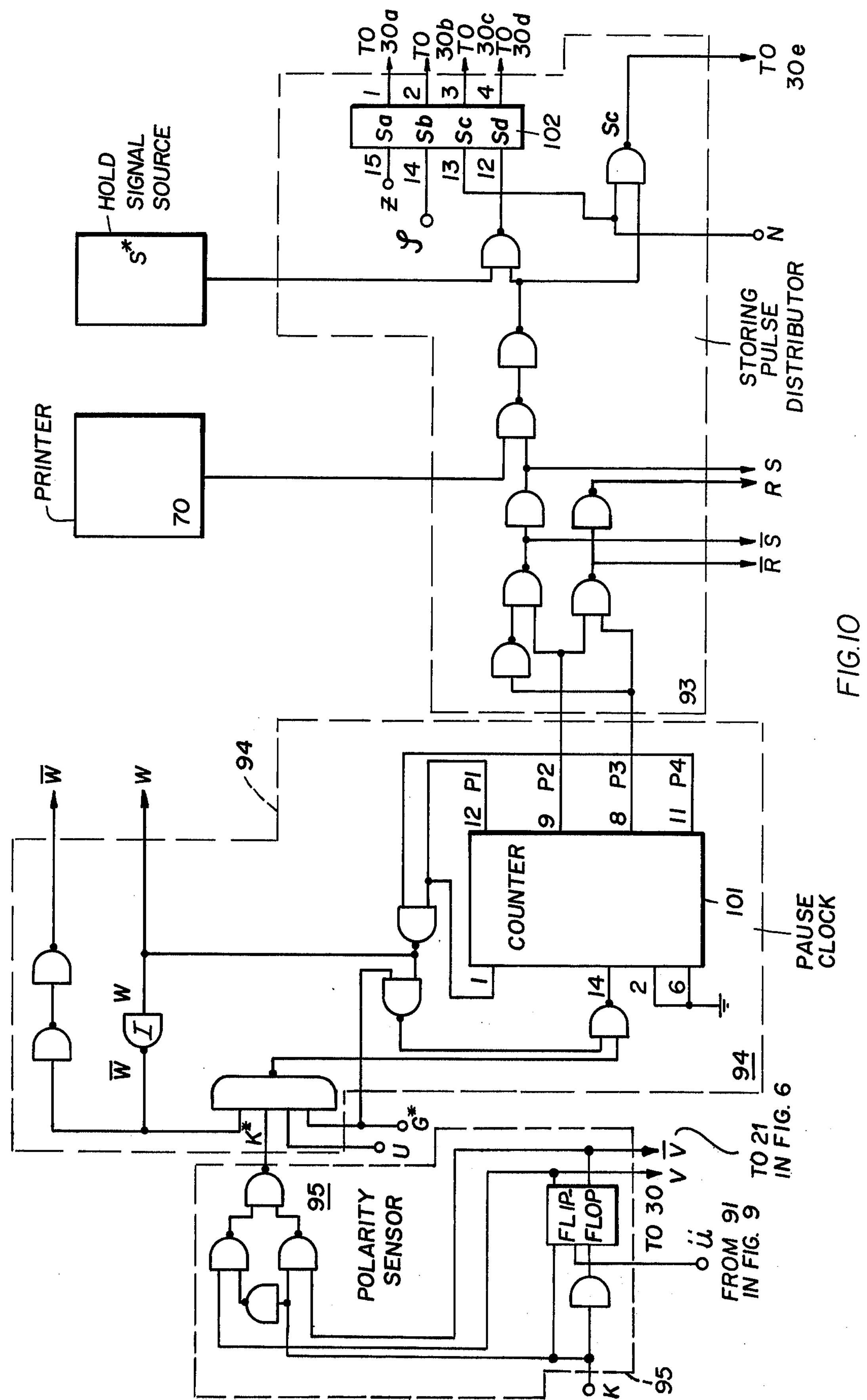

The analog direct voltage measured value $U_M1$ may, for example, correspond to +8 volts and is derived from the measuring of an unbalance, for example, as described with reference to FIG. 5 or in said Austrian Pat. No. 208,626. The measured value is supplied to an input distributor circuit 21 which may, for example, be an analog scanning switch of the type DG-200 manufactured by Siliconics Corporation and including field effect transistors. The input distributor circuit 21 has control input signals A connected to a control circuit 23 to be described in more detail below. The control input signals A include the signals Z, N, E, H, and L, as well as V, $\overline{V}$ (see FIG. 6) which will also be discussed below. The output of the input distributor 21 is connected to an integrator circuit 22, which may be of conventional design, for example, of the type TOA 8709 manufactured by Transitron Corporation. The output of the integrator 22 is connected to a comparator circuit 25 which may be a conventional positive feedback operation amplifier which ascertains, together with the detector 95, the polarity of the integrated voltage from the rise or fall of the analog direct voltage. The duration of the integration for the measured value $U_M1$ is determined by the clock pulse generator 26 which controls a counter 24 through the control circuit 23. For example, when the counter reaches a predetermined count, such as one thousand pulses, this count is detected in the carry gate 90 (FIG. 9). The gate 90 controls the control circuit 91 and thence the multiplex clock 92, to produce an integration stopping signal, as will be explained in greater detail in the following paragraphs. The integration by the integrator circuit 22 is terminated under the control of the distributor 21 when said predetermined count is reached as signified by an overflow signal, and the counter 24 is by the reset signal caused by the overflow reset to a starting position. Simultaneously, a constant voltage V,$\overline{V}$ for example, −10 volts is supplied to the integrator 22 through the input distributor 21. The constant voltage polarity is always opposite to that of the polarity of $U_M1$. The opposite polarity is derived from a flip-flop circuit FF in polarity sensor 95 (FIG. 10). As a result, the voltage change in the integrator 22 is now in the opposite direction as compared to the rise when the value $U_M1$ was supplied. This opposite change to a maximum value of −8 volts remains effective until the output value of the integrator 22 that it had prior to the supply of the value $U_M1$, at which time a signal is applied from the output of the comparator 25 to the control circuit 23. This integration time is ascertained by counting the pulses from the clock pulse generator 26 which may, for example, have a frequency of 20 kHz, in the counter 24. Thus, the integration time represents a digital value for the analog voltage $U_M1$. For example, 8 volts (analog) may correspond to 800 pulses. The counter 24 may, for example, comprise three decade counters 1, 2, 3 connected with each other and a J-K flip-flop for ascertaining the overflow. The decade counters may, for instance, be of the type 7490A manufactured by Texas Instruments Incorporated. The J-K flip-flop may, for instance, be of the type 7473 also manufactured by Texas Instruments Incorporated. Incidentally in the following text, when reference is to certain integrated circuit modules, the module number will be followed by TI meaning Texas Instruments Incorporated. The count reached by the counter 24 is supplied to the control circuit 23, which in turn supplies the value to a digital memory or storage 30*a* also comprising three decades and overflow means for a binary coded decimal storage. The memories 30*a* to 30*e* may, for example, comprise integrated circuit modules of the type 7574 (TI). The value stored in the storage or memory 30*a* is supplied to a drive circuit 31*a* which functions as a decoder for the BCD values stored in the memory 30*a*. The drive or decoding circuits 31*a* to 31*d* may, for example, be of the type 7446 (TI) for energizing a seven segment display in the indicator units 32*a* to 32*d*. For example, the display segments may be light emitting diodes of the type SLA1 from Opcoa Incorporated. However, the invention may also be realized with different display means, for example, so called Nixie tubes may be employed. Each display unit will comprise for each decade the mentioned seven segment digit, as well as an overflow and the sign indication (+ or −).

Simultaneously with the digital display, the polarity direction (i.e. signal K) supplied by the comparator 25 to the control circuit 23 is supplied by the latter in the form of signal V to a storage 30*a* and the respective driving circuit 31*a* so as to also be displayed in the display unit 32*a*. The same considerations apply to memories 30*b*, 30*c*, 30*d* and 30*e*. Furthermore, and also simultaneously with the just mentioned two displays of the digits and the polarity, the machine constants are also displayed, for example, by means of light emitting diodes as shown in FIG. 4 to indicate dimensions such as milligram, gram, kilogram, as well as degrees or a division or multiplication factor to change the display range. This is accomplished by a display control circuit 33 which will be described in more detail below with reference to FIG. 2. The type of additional display of dimensions and the like is controlled by respective switch positions in the measuring transducer of the balancing apparatus. Incidentally, the drive circuit 31*e* is of the same type as 31*a* to 31*d* described above, however, without the indication of a sign (+ or −). Similarly, the indicating unit 32*e* for the rpm is embodied by the same display means as the display units 32*a* to 32*d* but without the sign. In addition, the display unit 32*e* provides for displaying a multiplication factor such as times 1 or times $10^3$ for the rpm.

Subsequent to the above described converting or transformation process of the first measured analog value $U_M1$ into a corresponding value which may be digitally displayed, the counter 24 is reset to 0 by the signal R derived in the storing pulse distributor 93 (FIG. 10) of the control circuit 23 (FIG. 1). The processing of the measured values $U_M2$ to $U_M5$ will take place in the same manner as the processing of the measured value $U_M1$ and the integrator 22, comparator 25 and the pulse generator 26 will function in the same manner, whereby the respective value will again be indicated in a digital manner through the control circuit 23, the memories 30*b* to 30*e*, the driving circuits 31*b* to 31*e* and the indicating units 32*b* to 32*e*, whereby the constant values supplied through the circuit 33 are taken into account as described.

The time multiplexing continues until all measured values, for example $U_M1$ to $U_M5$, have been processed through the memory or storage means 30*a* to 30*e* in the driving circuits 31*a* to 31*e* for their display in the indicator units 32*a* to 32*e*. Thereafter, a new measuring period or interval begins automatically.

Figure 2:
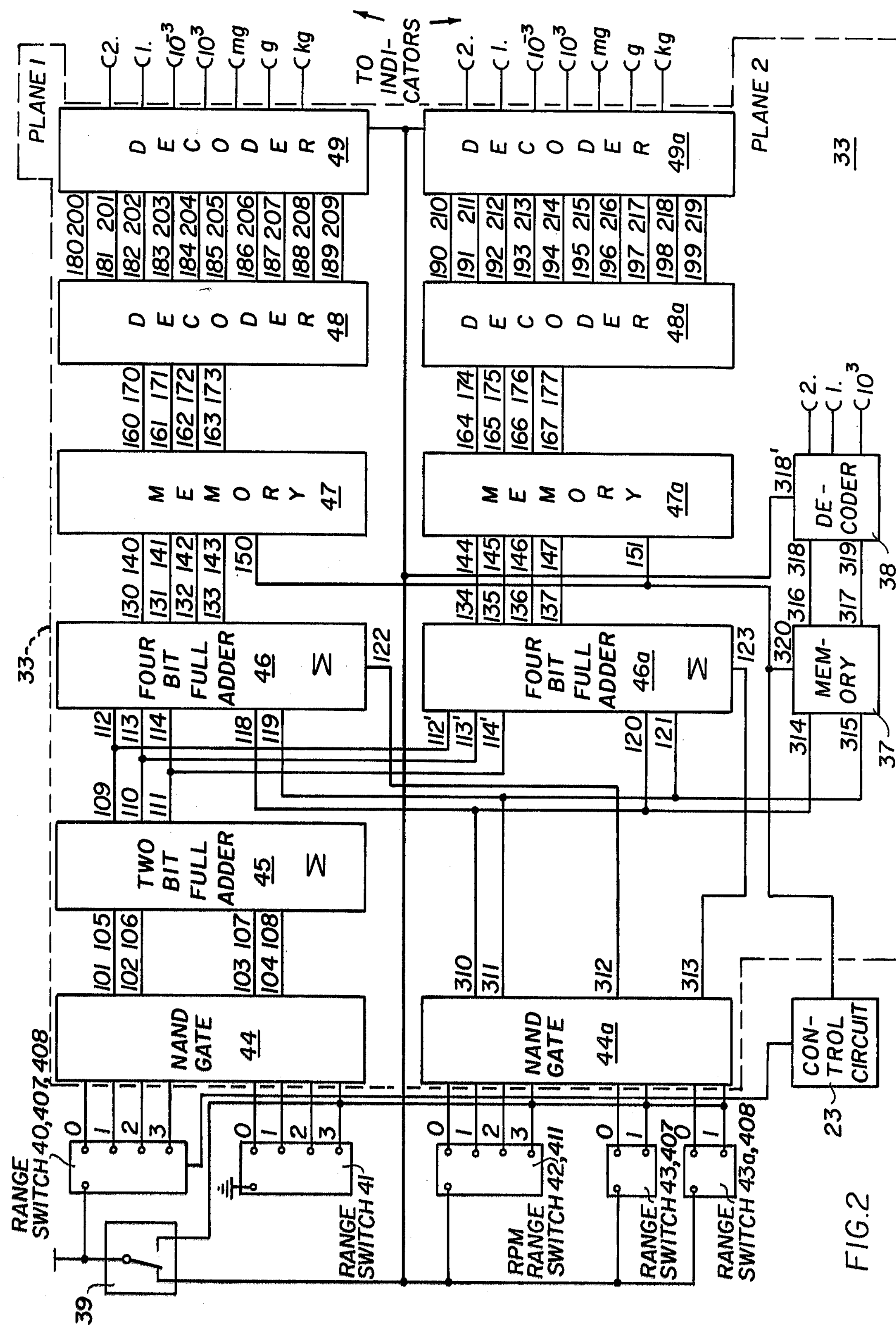
FIG. 2 shows in somewhat simplified form a circuit arrangement employed in the block diagram of FIG. 1 for controlling the position of the decimal point or points and the units of the display, as well as the portions of the display which are without any dimension, said control depending on the position of the range selection switches.

If it is desired to continue the display of values in the indicator units 32*a* to 32*e*, a hold input signal, such as a determined voltage is supplied to the hold input S* of the control circuit 23, for example, by way of a manually operated switch (not shown). This signal may, for example, change the control circuit function from storing to measuring and vice versa. Thus, measured values may remain stored and the display may continue as long as desired for evaluation even where further rotation of the rotor has been stopped, in other words, when no further measured values are supplied from the balancing machine. Further, in order to provide a permanent record, a printer 70 is connected to receive its input signals from the memories 30*a* to 30*e*. A control signal generated by the printer 70 is applied to the control circuit 23 and assures that during the printing of a set of values stored in the memories 30*a* to 30*e* no further measured values may be supplied from the control circuit 23 to these memories or storage means 30*a* to 30*e* because during the printing the value to be printed may not be changed. Switches 40, 41, 42, 43 and 43*a* are provided in the measuring or transducer device of the balancing machine, as shown in FIGS. 2 and 5. These switches are manually actuated by the operator. As illustrated in FIG. 5, the switches 40 to 43*a* are selectively coupled to the attenuators 407 and 408 as well as an attenuator 411 for the reference signal. The control of the switches 40 to 43*a* thereby modifies the measured signals from the sensors 405 and 406 before they are applied to the analog multiplier 409 for combination with the reference signal to produce the adjusted measured value signals $U_M1$ to $U_M4$. Since the attenuation in the attenuators is controlled by the manually operated switches 40 to 43*a*, which are, for example, mechanically coupled to control the attenuators, the values corresponding to the attenuation or adjustment of the measured value signals may be provided by the switches 40 to 43*a*.

The constant display circuit 33 shown in block form in FIG. 1 will now be described in more detail with reference to FIG. 2 which displays the parameters of unbalance of two planes of the rotor. Switch 39 enables a bypassing of the switches 41, 42, 43 and 43*a*. This switch may be built into the unit 33, and it also may be a hand-operated switch. The switching arm of this switch is connected to ground potential. In one switching position, the switch thereby bypasses or grounds the switches 41 to 43, so that the units mg/g/kg are not addressed in the decoders 49 and 49*a*. If the switching arm of this switch is in its left-hand position, however, then all of the output functions of the unit 33 are effective, i.e. the mg/g/kg and decimal point outputs are operative. The range switch 40 is an attenuation switch for the measuring device in the balancing machine. Preferably, the switch 40 is a binary coded digital switch of conventional construction. The range switch 41 is provided for a sensitivity selection or adaptation, whereby again each switch position is coded. The switch 41 takes into account the spring stiffness as well as the size of the balancing machine. The range switch 42 enables the operator to select the proper rpm range for any particular type of machine. Here again, each switch position is coded. The range switch 43 enables the operator to select a particular radius of the rotor to be balanced in one plane, whereas the range switch 43*a* provides for the selection of the radius in a second plane. While the switches 40 to 43*a* have been illustrated as simple switches, this is for the purpose of illustration only, and as discussed above, the switches are preferably arranged to provide coded binary outputs.

The bypassing of the selector or range switches 41 to 43*a* by means of the switch 39 enables the indication of values not having any dimension (div. values). The selector switches 40, 41 and 42 have each four switch positions, whereas the radius selector switches 43 and 43*a* have each two switch positions. Each switch position is correlated to or represents a factor in the form of a number. For example, the switch positions of the switches 40, 41 and 42 correspond to the numbers 0, 1, 2, and 3, whereas the switch positions of the switches 43 and 43*a* correspond to the numbers 0 and 1. Changing from one switch position to the other will cause a respective change in the indicated values at the indicator units. In the example embodiment of FIG. 2, the range switches 40, 41, 42, 43 and 43*a* are preferably switches that can be stepped in decades, whereby each change causes a corresponding change of the indicated value by the factor 10. However, the invention is not limited to the use of decade switch means which have been merely used for the sake of simplifying the understanding. The factors as represented by the respective switch positions are supplied to the NAND-gates 44 and 44*a* for binary coding. These NAND-gates may, for example, be of the integrated circuit type 7400 (TI). The outputs 101 and 102 of NAND-gate 44 thereby represent, in binary form, the connected position of the switch 40. Similarly, the outputs 103 and 104 of NAND-gate 44 represent, in binary form, the number corresponding to the switch position of the range switch 41. In a similar manner, the outputs 310 and 311 of NAND-gate 44*a* represent, in binary form, the connected position of the switch 42. Since the switches 43 and 43*a* are only two position switches, the outputs 312 and 313 of the NAND-gate 44*a* are adequate to represent, in binary form, the connected position of these latter switches, respectively. With respect to each of the above series of outputs of the NAND-gates 44 and 44*a*, the first mentioned output terminal may represent $2^0$ and the second mentioned output represents $2^1$.

The outputs 101, 102, 103, 104 of the NAND-gate 44 are connected to inputs 105, 106, 107, 108 of a two bit full adder 45, which may be of the integrated circuit type 7482 (TI). The two bit full adder 45 adds the binary signals received from the attenuation range switch 40 and the sensitivity range switch 41. Thus, the outputs 109, 110 and 111 represent the $2^0$, $2^1$, $2^2$ functions of the sum of the position numbers of the switches 40 and 41.

The outputs 109, 110, 111 of the two bit full adder 45 are connected to inputs 112, 113 and 114 of a four bit full adder 46. These outputs 109, 110 and 111 are also connected to inputs 112', 113', and 114' of a further four bit full adder 46*a*. The four bit full adders 46 and 46*a* may be of the integrated circuit type 7483 (TI). The four bit full adders 46 and 46*a* have further inputs 118 and 120 connected to the output 310 of the NAND-gate 44*a* and inputs 119 and 121 connected to the output 311 of the NAND-gate 44*a*, whereby the binary signals representing the factor of the rpm range switch 42 are included in the signal addition. As a consequence, the outputs 130, 131, 132 and 133 of the four bit full adder 46 as well as the outputs 134, 135, 136 and 137 correspond to the $2^0$, $2^1$, $2^2$, and $2^3$ values with respect to the sum of the positions of the range switches 40, 41 and 42.

A still further input 122 of the adder 46 is connected to the output 312 of the NAND-gate 44*a*. A further input 123 of the adder 46*a* is connected to the output 313 of the NAND-gate 44*a*, whereby the selected balancing radius of the balancing plane 1 and of the balancing plane 2 are taken into account. It will be recalled that the range switches 43 and 43*a* enable the operator to selected the balancing radius in the respective balancing plane. The outputs 130, 131, 132 and 133 of the adder 46 are connected to respective inputs 140, 141, 142, 143 of a memory or storage 47. Similarly, the outputs 134, 135, 136 and 137 of the adder 46*a* are connected to respective inputs 144, 145, 147, and 148 of a memory 47*a*. The memories 47 and 47*a* may, for instance, be 4D-flip-flops of the type 7474 (TI). The memories 47 and 48 have respective inputs 150 and 151 connected to the control circuit 23 of FIG. 1. Thus, the transfer of the content of the memories 47 and 47*a* to the decoders 48 and 48*a* is controlled by the control circuit 23. The memory 47 is connected with its output 160, 161, 162, 163 to respective inputs 170, 171, 172, 173 of the decoder 48. The memory 47*a* is connected with its outputs 164, 165, 166, 167 to respective inputs 174, 175, 176 and 177 of the decoder 48*a*. The decoders 48 and 48*a* decode the summed binary coded signals back into individual signals. The decoders 48 and 48*a* may be of the BCD-decimal-decoding type, for example, 7442 (TI). The outputs 180 to 189 of the decoder 48 are connected to inputs 200 to 209 of a further decoder 49. Similarly, the outputs 190 to 199 of the decoder 48*a* are connected to inputs 210 to 219 of a further decoder 49*a*. The further decoders 49 and 49*a* comprise NAND-gates and inverters by means of which, for each plane separately, the respective constants are selected in accordance with the position of the corresponding switches 40 to 43*a*. Thus, the outputs of the further decoders 49 and 49*a* are connected to the indicator units for the display of the first and second decimal point and for the division or multiplication factor and certain dimensions, such as kilograms, grams and milligrams. As shown in FIG. 4 and described above, the indicator units 32*a* and 32*e* are provided, for example, with light emitting diodes for the display of these factors.

The signals coming from the rpm range switch 42 appearing at the outputs 310 and 311 of the NAND-gate 44*a* are also supplied to the inputs 314 and 315 of a memory 37, for example, a 4D-flip-flop of the type 7475 (TI). The memory 37 stores this information in response to a respective instruction received at its input 320 from the control circuit 23. The signal values appearing at the outputs 316 and 317 of the memory 37 are supplied to inputs 318, 319 of a decoder 38 comprising inverter circuit means for depriving from the stored signal values the rpm units as well as the decimal point and the multiplication factor, as shown at the respective outputs of the decoder 38. These outputs are connected to the respective inputs of the indicator unit 32e, which, for example in FIG. 4, displays an rpm of 1,089 and a multiplication factor of 1. This example is an overflow value and signifies to the operator that a range change should be made by actuating the respective switch.

If the measured value exceeds the measuring range, for example if $U_M > V, \overline{V}$, ($U_M >$ 10V), the control circuit 23 will cause an indication of this exceeding of the measuring range by energizing or lighting up, e.g. the "1" digit for an indication of 1,000 mg in the corresponding indicator unit. If the operator observes such an indication he may remedy the situation by switching back the attenuator range switch 40, as mentioned above.

As shown in FIG. 1, the indicator units 32a, 32b, 32c, and 32d may, for example, be designed to display three decimal digits. Thus, if in all four indicator units only the last two possible digits are displayed, a discriminating or decision circuit arrangement 54 will control the extinguishing of the respective first digit thereby providing a conspicuous hint to the operator that a full utilization of the three decimal positions is available for each plane.

Figure 3:
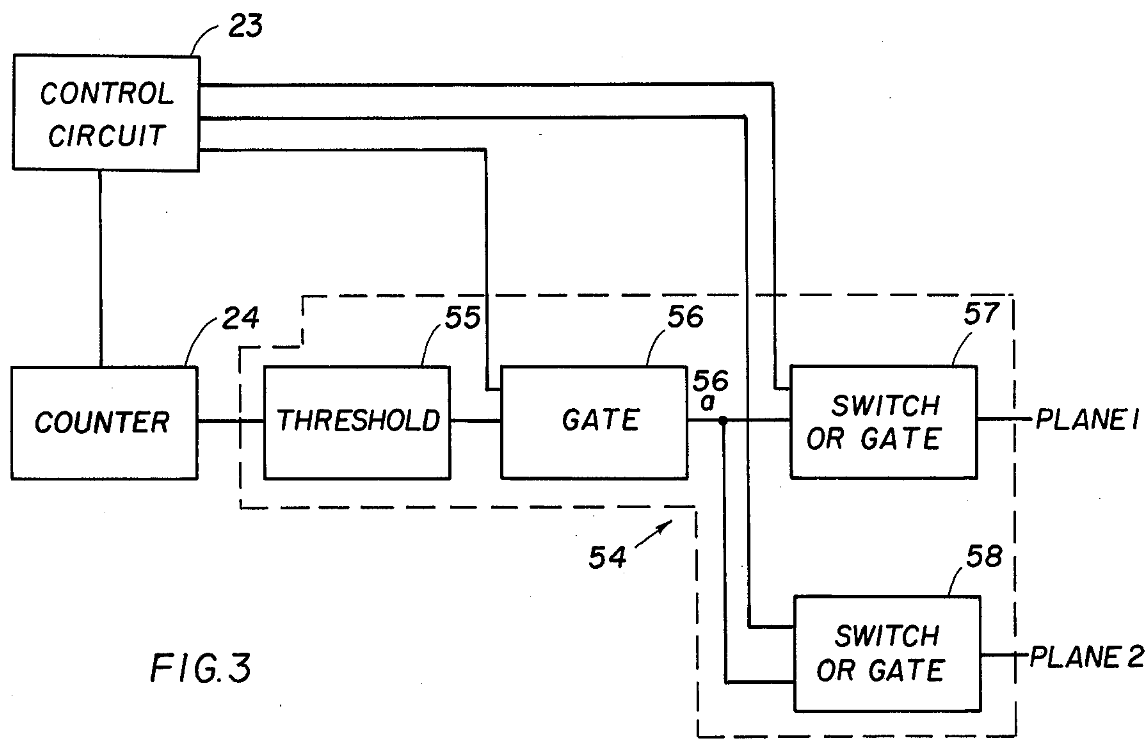
FIG. 3 is a circuit arrangement for indicating the falling of a measuring value below the measuring range in a display unit.

The decision or discriminating circuit 54 is connected to the control circuit 23, as well as to the counter 24 as shown in FIG. 1. Further, the discriminator 54 is connected to each of the drive circuits 31a to 31d. The decisions or discriminator circuit 54 is arranged so as to suppress the hundreds digit for all components or rather for all values when the indicated value is below 090, for example, when the indicated value is 89 milligrams. For this purpose the discriminator circuit 54 includes, as shown in FIG. 3, a threshold circuit 55 which ascertains from the counter 24 the fact that 90 units are not exceeded. The threshold circuit 55 comprises, for example, two integrated circuits of the type 7400 (TI) and 7410 (TI). The circuit arrangement is such, that the gate 56, which is connected with its inputs to the control circuit 23 and to the threshold circuit 55, changes its output state of the output 56a when the threshold value, for example 90 units, is exceeded. The output 56a of the gate 56 is connected to switches or gates 57 and 58 which are also connected to the control circuit 23. The output of the switches 57 and 58 are connected to the indicator units 32a to 32d for the respective plane 1 or 2. For simplicity, this is illustrated by a single trunk line in FIG. 1. The change of state at the output 56a opens the respective switches 57 or 58 so that the values for the first decimal digit stored in the memories 30a to 30d may pass to the indicating units 32a to 32d. The switches 57, 58 for example, comprise gates of the type 7410 (TI) or 7400 (TI) which either cause a passing of values exceeding 90 units or which extinguish the hundreds digit.

In one embodiment of the arrangement of FIG. 3, the threshold value is selected to be 90 pulses from the counter 24, whereby it is assured that the first decimal digit or rather the hundreds digit becomes 0, when the counted clock pulses are less than 100 and that said 0 is extinguished when the counted clock pulses for the integration of the constant voltage $V, \overline{V}$ becomes less than 90. If, according to FIG. 2, the attenuation selector switch 40 still permits an increase in the sensitivity it is possible by increasing the sensitivity to increase the indicating or display accuracy from two decimal digits to three decimal digits provided that at the indicator units 32a and 32c, which serve for the display of one component of the respective plane, only the last two decimal digits are indicated or displayed. State differently, if in the just mentioned example the indicator unit 32a displays a two digit number and the indicator unit 32c displays a three digit number, then the sensitivity selector switch 40 may not be actuated. This condition is indicated to the operator by the fact that in the indicating unit 32a the 0 is not extinguished even if the number is smaller than 90.

Where the unbalance is displayed in a polar coordinate manner by its value and its angular position, it is possible that the angular measured value becomes indefinite where the unbalance value is rather small. In order to avoid such an ambiguity, FIG. 1 shows a suppression circuit 60 which is constructed similarly to the threshold or discriminator unit 54 discussed above with reference to FIG. 3. The suppression unit 60 extinguishes all angular displays in response to the fact that the measured unbalance value becomes smaller than 1% of a predetermined value. In order to assure a well defined display of an angular value, which is supplied as an analog signal at the respective input of the input distributor 21 and which analog value has an overlap range of about 40°, it is necessary to reset the counter 24 to 0 when the analog value of the angle reaches 360°. This is accomplished by means of a control pulse supplied by the control circuit 23 to the counter 24 for resetting the latter.

An rpm monitoring circuit 65 is connected to the drive circuit 31e for the rpm indicator unit 32e. The monitor circuit 65 comprises, for example, gates of the type 7400 (TI). This circuit 65 is also responsive to the measured rpm. If the indicated rpm is too small relative to the unbalancing rpm, or if the rotor to be balanced is stationary, the circuit 65 supplies an additional signal to the control circuit 23 to assure that the indicating units 32a to 32d display the value 0 for the just mentioned conditions of the balancing machine. This is done by stopping the clock generator 26 so that the counter 24 does not receive further signals through the control circuit 23 from the clock generator 26.

It is possible to inteconnect the attentuation selector switch 40 with the discriminating circuit 54 via the control circuit 23. In this manner an automatic measuring selection may be accomplished. Similarly, an interconnection between the circuit 65 and the range switch 42 for the rpm via the control circuit 23 will accomplish an automatic range switchover.

Figure 6:
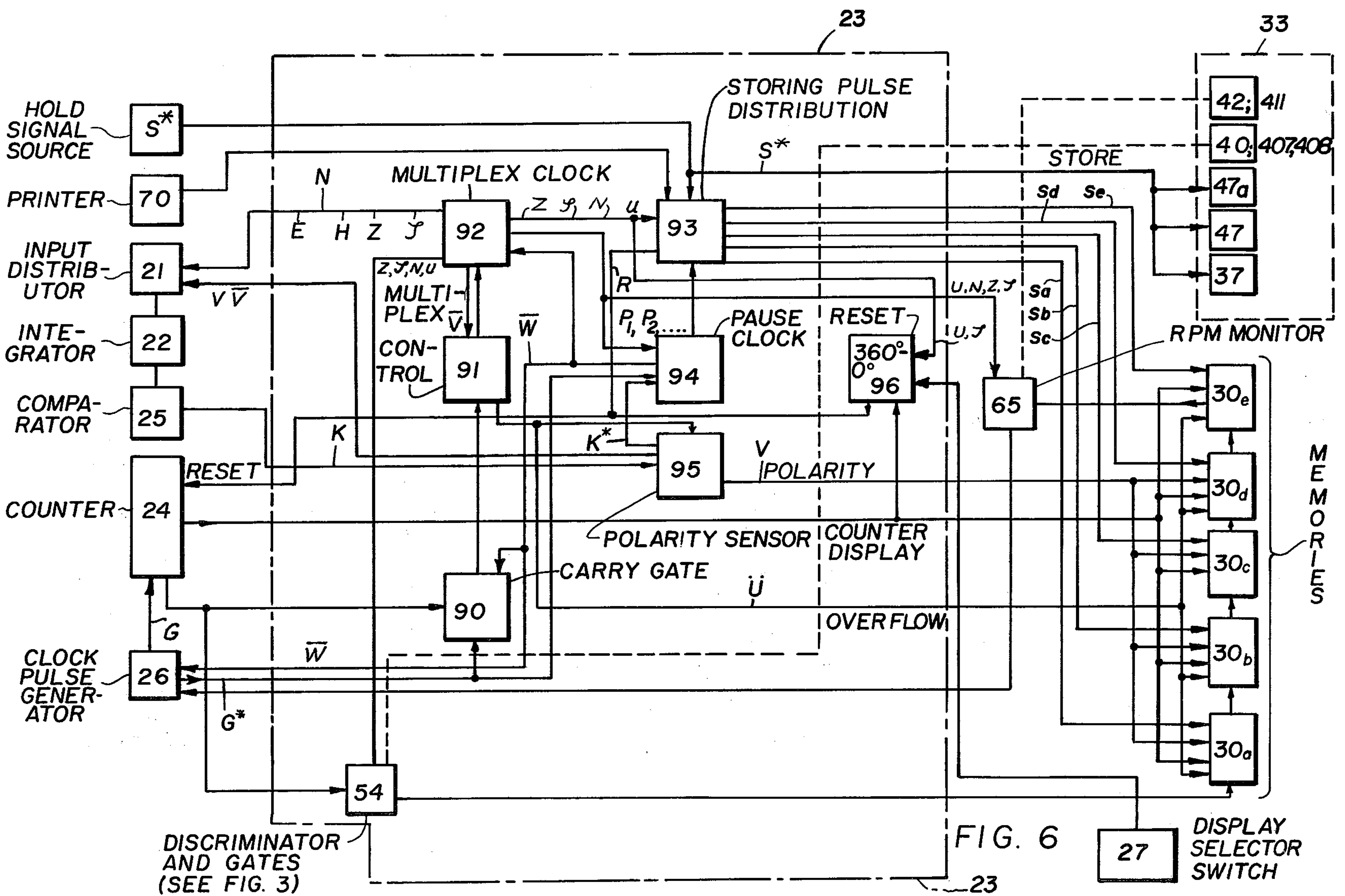
FIG. 6 illustrates one embodiment of the control circuit.
Figure 7:
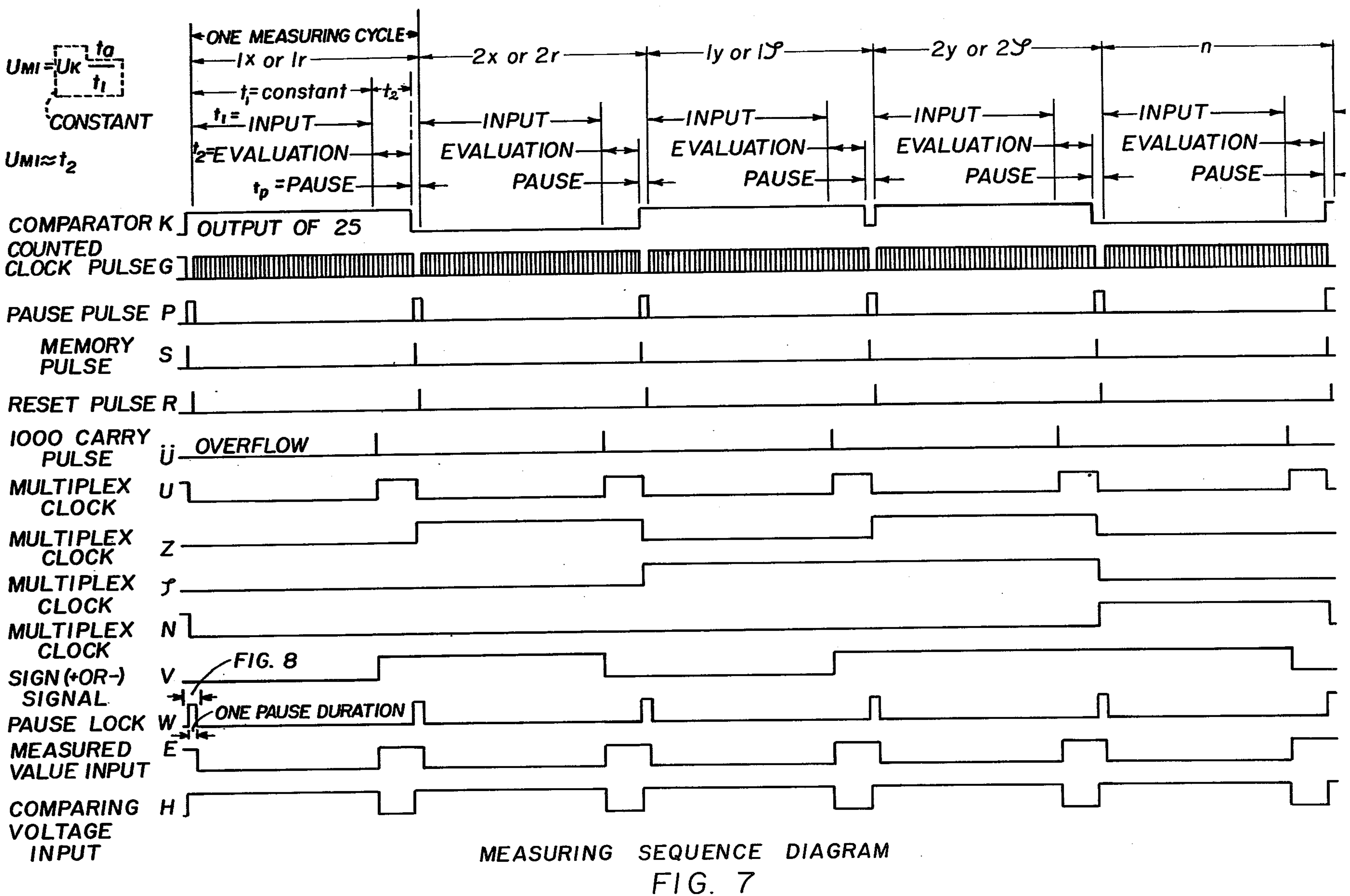
FIGS. 7 and 8 illustrate various signals in the circuit of FIG. 6; whereby
Figure 8:
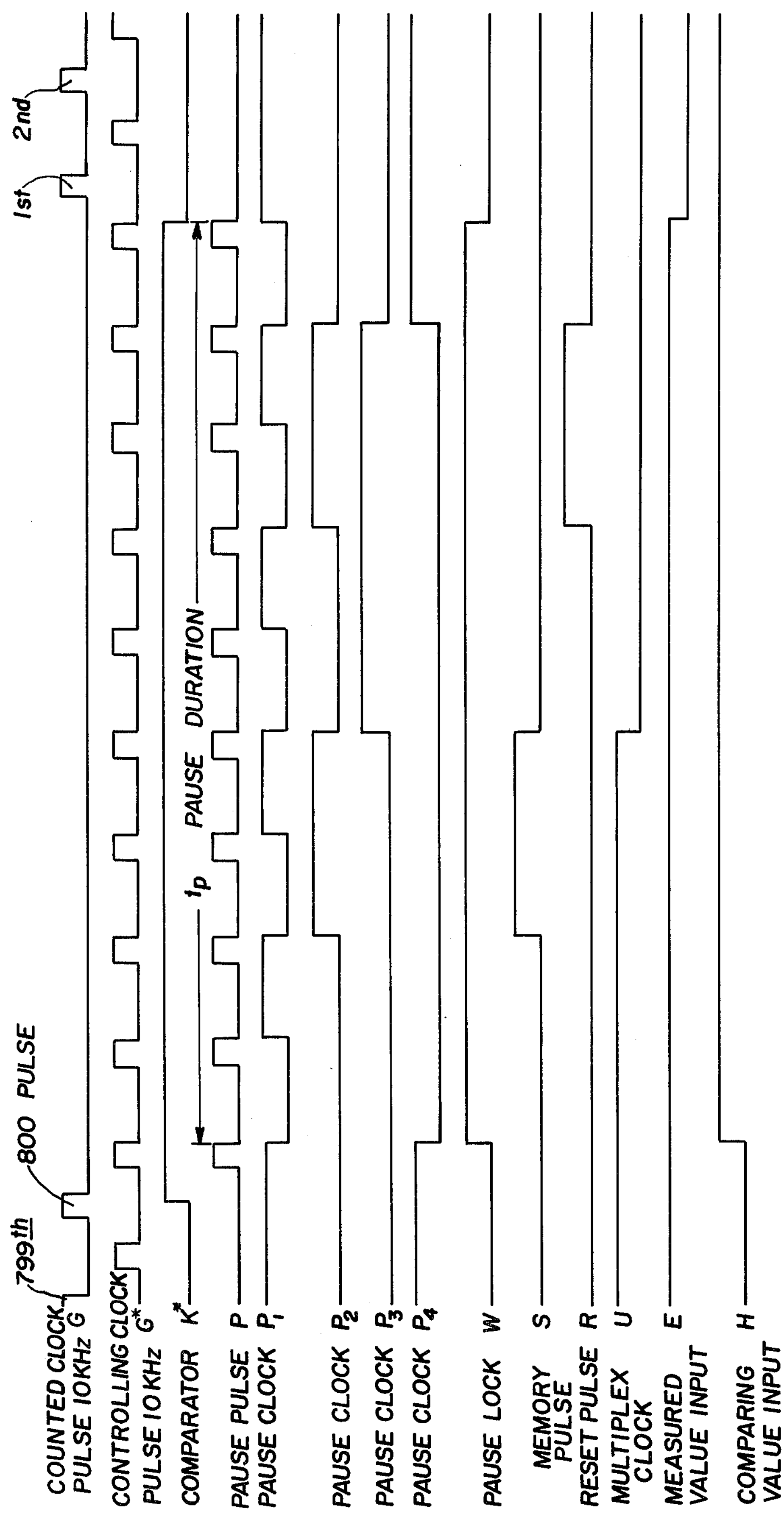

FIG. 6 illustrates in greater detail one embodiment of the control circuits 23, and FIGS. 7 and 8 further show respectively the signals in the circuit of FIG. 6 for a measuring sequence and a pause condition. The circuit diagram of FIG. 6 includes reference letters on the various lines therein in order to correlate the signals on these lines as identified in FIGS. 7 and 8. In FIG. 6 it will be noted that multiple signals are indicated on some of the lines. This designation indicates that the line in fact comprises a plurality of conductors, each of which carries a separate one of the indicated signals.

Referring now to FIG. 6, a carry gate circuit 90 senses the count output, for example, the thousandth pulse output of the counter 24. The carry gate 90 is connected also to the clock pulse generator 26 for controlling the overflow by applying an overflow pulse Ü to the memory circuits 30*a* to 30*e* through control 91, see FIG. 9. A multiplex control circuit 91 is controlled by pulse outputs of the carry gate 90 in order to provide an output for the control of the multiplex generator 92.

The multiplex clock generator 92 is employed to control the measuring sequence. It functions as a ring counter, i.e., a BCD counter. The pulse distributor 93 is controlled through the multiplexed clock 92 by signals Z, $\phi$ and N and directs the store pulses S*a* and S*e* from the pause clock 94 to the memories 30*a* to 30*e* respectively.

The pause clock generator 94, which may comprise a ring counter 101, such as a BCD counter, is controlled by the output of the comparator 25, which produces the output signal K, and by way of the polarity sensor 95, which produces the output K*. The clock pulse signals from the pulse generator 26 are also applied to the pause clock 94. The store pulses S*a* to S*e* and the reset pulse R are derived from the outputs P of the ring counter 101. During this time when the store pulses S*a* and S*e* and the reset pulse R are derived, an inverted locking pulse $\overline{W}$ produced by pause clock 94 and applied to the carry gate 90 and the multiplex clock 92 as shwon in FIG. 9 prevents the input of measured or comparing values.

The polarity sensor 95 serves for the purpose of supplying the polarity of the output signal of the comparator 25 to the memories 30*a* to 30*e*. In addition, the polarity sensor 95 provides a signal K which produces signal K* in the polarity sensor 95 for signifying to the pause clock 94 the end of the evaluation of the integration, and it controls the pause clock generator 94. The polarity sensor 95 also provides the signals V and V. Signal V is supplied to the memories 30*a*, . . . , signal V is supplied to the input distributor 21.

The reset circuit 96 is responsive to the measuring of the angle $\phi$ represented by the signal $\phi$ in FIG. 7. The value of the counter 24 is controlled through gates and upon reaching of 360°, the counter 24 is reset to 0°. In other words, the output of the counter 24 corresponding to the angle is applied to the reset circuit 96. When the signal applied to the reset circuit corresponds to an angle of 360° , a reset signal is produced and applied to reset the counter 24. Thus, any confusion resulting from the display of an angle indication greater than 360° is avoided. The reset circuit may accordingly comprise a comparator. If the displayed function is not to be in terms of polar coordinates, for example, if the input signals correspond to the *x, y* coordinates, then the reset circuit 96 is not necessary. In fact, it may be necessary to disable the reset circuit to avoid an erroneous indication. For this purpose, a switch 27 is connected to the reset circuit 96, as shown in FIG. 6 (i.e. to the control circuit 23, as illustrated in FIG. 1). The switch 27 merely disables the reset circuit 96 when rectangular coordinates are to be displayed, for example, by grounding or otherwise shortening a portion of the comparison circuit. The switch 27 is controlled only when the coordinate system to be displayed, is changed, in response to a corresponding change of the input signals applied to the analog multiplier.

The $\phi$ pulse and the multiplex clock pulse U are applied to the reset circuit 96 from the multiplex clock 92, so that the reset circuit is operative only during those portions of the cycle of operation requiring the display of angle indicating signals. In other words, in the above example, the $\phi$ signal enables the reset circuit 96 only during the portion of the operation corresponding to the control of the indicator units 32*c* and 32*d*.

FIG. 9 illustrates suitable circuits for the carry gate 90, the multiplex control circuit 91 and the multiplex clock circuit 82. The carry gate 90 may comprise NAND-gate, such as type 7430 (TI). The multiplex control circuit 91 may comprise the four NAND-gate sections of type 7400 (TI). The NAND-gates of the multiplexed clock circuit may also be of the type 7400 (TI), with the decimal counter 100 therein being of the type 7490 (TI), or Siemens Type FLJ 161. In this figure, as in FIG. 10, signals derived in the circuit are indicated by arrows, while signals applied to the circuit are indicated by circular terminals.

FIG. 10 illustrates the details of the polarity sensor 95, the pause clock 94, and the storing pulse distributor 93. These circuits employ conventional NAND-gates, such as NAND-gates 7400 (TI), NAND-gates 7420 (TI), and NAND-gates 7430 (TI). In addition, the pause clock 94 includes a decimal counter 101 which may be of the type Siemens FLJ 161 or type 7490 (TI). The storing pulse distributor 93 further includes a BCD to decimal decoder 102, of the type Siemens FLH 281, or the type type 7442 (TI).

The reset circuit 96 of FIG. 6 may comprise a NAND-gate connected to receive determined outputs of the counter 24, for the sensing of the necessity to produce a reset signal. The signal U from the multiplex clock 92 may also be applied as an input to this NAND-gate 96.

FIGS. 7 and 8 show the wave forms of various signals in the system, as indicated, for example, by the corresponding letters in the illustrated circuits. Thus, FIG. 7 illustrates generally the overall measuring sequence, while FIG. 8 shows on an enlarged time scale the pulses occurring during the pause portions of the overall sequence.

As illustrated in FIG. 7, the cycle is separated into five sequential portions, corresponding to the five indicator units 32*a* and 32*e*. Each of these five time periods is further divided into three sequential subperiods, corresponding to the constant length input time during which the input signal is applied to the input circuit, i.e., the initial constant integration period, the evaluation time of variable length corresponding to the amplitude of the input signal, and the pause time for updating the stored information with respect to the particular portion of the cycle of concern, as well as other control functions.

Referring now to FIG. 7, the signal K represents the output of the comparator 25. It will be appreciated that this signal will have a transition at the end of each evaluation period, the direction of the transition depending upon the polarity of the input signal being measured.

The one thousandth carry pulse Ü is generated in response to the detection of a determined count in the carry gate 90, for indicating the termination of the input portion of the cycle sections, and the consequent commencement of the evaluation periods. As discussed above, the termination of the evaluation period is signaled by transition in the signal K.

To further facilitate the understanding of the present circuit arrangement, it must be kept in mind that an exceeding of a measuring range in one of the indicator units 32*a* to 32e is present when for a selected decimal position and unit more digits would be required than are available. On the other hand, a falling below a selected measuring range is present when the first digit of a numerical display becomes 0. Stated differently, the measuring range of the measuring unit is not fully utilized. Such less than full utilization of the possible indicator accuracy or display accuracy does not involve a faulty indication. However, an exceeding of the selected measuring range does involve a faulty indication because the first digit of the measured value to be displayed cannot be indicated. Thus, where the measuring range is exceeded even only a single indicator unit, it is absolutely necessary to provide for a range switching. Where a falling below the selected measuring range is involved, a range switching may be made only for each balancing plane in its entirety. However, where the unbalance magnitude is indicated by components, the range may be switched only if both component indicator units simultaneously display a falling below the selected measuring range. Where the display is in a polar coordinate to indicate the magnitude and angle of the unbalance, the range switching will depend only on the falling below or on the exceeding of the measuring range by the unbalance magnitude, but it will not depend on the angle. The above described features of the invention assure a digital display of the unbalance measured values, whereby all influencing magnitudes an adjustment values, which may depend on the particular balancing apparatus, as well as on the measuring instrument are taken into account and whereby a signal indicates when a range switching becomes necessary. This feature of the invention substantially increases the assurance of a correct reading of any indication or display.

In most instances it is sufficient to employ the signal which is produced in response to the falling below or in response to the exceeding of the measuring range for actuating solely the attenuation range selector switch 40 because its adjustment is sufficient in most instances to return the indicated measured value into the measuring range of the indicator units. As mentioned, it is preferable to provide the selector switches with decade steps, so that a respective decade factor is correlated to each switch position and all factors of the range switch positions are added for the purpose of indicating the decimal points and the units. This feature has the advantage that any change in the range switch positions causes a respective change in the indicated measured value by the power of 10, whereby merely the magnitude units or rather the decimal point positions require a change while the digit sequence remains unchanged as a result of the range switching.

As mentioned above, it is possible according to the invention to provide an automatic range selection at least of one of the range switches in response to a falling below of the selected measuring range or in response to an exceeding of the selected measuring range. This feature has the advantage that the operator does not need to actuate the range selector switches by hand in response to a respective signal. Where the balancing machine is provided with means for measuring the rpm, in accordance with the invention, the analog value representing the rpm is also processed through an analog to digital converter and stored in a digital manner for its digital display in correct rpm units. According to the invention, the rpm is monitored and a circuit arrangement is provided for suppressing all unbalance indications in response to the rpm falling below a predetermined small analog rpm value and in response to the fact that the memory or storage means are not switched on. Thus, according to the invention the rpm values are being monitored for producing control signals in response to the falling below or exceeding of the actual rpm relative to the respective predetermined rpm values. Preferably, such control signals are used to automatically switch-over the rpm range in response to the fact that the storage means are switched off. This feature of the invention has the advantage that it prevents the measuring of an unbalance in rpm ranges which are not well suited for the balancing operation.

It should also be mentioned that the teaching of the invention is not only useful in connection with a multiplication method, but it is advantageously applicable also to signal combination methods, which employ filters tuned to the rpm of the rotor to be balanced along with stroboscopic devices or to methods which combine signals by means of controlled rectification.

Another advantage of the invention is seen in that the suppression of the angle indication in response to small unbalance values, which are indicated in a polar coordinate fashion, avoids the display of an ambiguous angular value, which is not significant for the unbalance measuring where the unbalance value itself is rather small.

Referring now to FIGS. 7 and 8 it must be kept in mind that FIG. 8 has an expanded time scale showing what happens during substantially one pause lock duration W. During this time the measured information is stored in the memories 47 or 47*a*. A measuring cycle is /*x* or /*r* and comprises the time input durations $t_1 + t_2 + t_p$ wherein $t_1$ is a fixed time determined by the counting of, for example, 1000 pulses in counter 24 during the time E when the input signals $U_{M1} \ldots U_{M5}$ to the integrator 22 are integrated. $t_2$ is the evaluation time and has a given relationship to the input time $t_1$ as follows $U_{M1} = V$ or $\overline{V}\ t_2/t_1$, wherein $U_{M1}$ is the respective input signal and V or $\overline{V}$ is a given, constant comparing voltage. Thus $U_M$ is proportional to $t_2$ since V or $\overline{V}/t_1$ = constant. $t_p$ is the duration of a pause as determined by the pause pulse P to properly store the measured result as mentioned above. The comparing voltage V or $\overline{V}$ is applied during the time H (comparing voltage input H). FIG. 7 further shows the output pulse K of the comparator 25 to indicate in a digital manner the respective polarity at the output of the integrator 22. The pulses G are the number of pulses counted during the input time $t_1$ by the counter 24 and as produced by the clock pulse generator 26. This generator 26 is a free running constant frequency oscillator producing the clock pulses G* shown in FIG. 8 to have, for example, a frequency of 10 $KH_Z$.

The pause pulses $P_1$, ..., at the output of the pause clock generator 94 determine the duration of a pause under the control of the comparator 25. For example ten pause pulses P may occur during a pause $t_p$ as shown in FIG. 8. The memory pulses S... cause the storing of the information in the memories 47. Only one memory pulse 5 is shown in FIG. 8. However, from FIG. 6 it will be appreciated that the storing pulse distributor 93 provides a plurality of storing pulses S, S*a*, S*b*, S*c*, S*d*, S*e*. These pulses are derived from the trailing edge of the pause pulses $P_1$, ... Similar considerations apply to the reset pulses R which terminate a measuring cycle and and which are derived from the trailing edge of a pause pulse.

The carry pulse U is caused by the counting of the 1000th pulse at the end of $t_1$ and in turn causes the multiplexing as is known in the art. The carry pulse U controls the state at the output of the comparator 25 and the required switching of the input H to $\overline{V}$ or V in the input distributor 21.

The multiplex clock generator 92 (FIG. 9) provides the signals U, Z, $\phi$, N which control the analog to digital conversion. U corresponds to $2^0$, Z corresponds to $2^1$, $\phi$ to $2^2$ and N corresponds to $2^3$.

The sign signal V (+ or −) is controlled by the comparator output K and in response to a carry signal Ü as shown in FIG. 10 lower left corner. The pause lock signal W determines the duration of a pause pulse P.

Referring to FIG. 8 the first pulse curve G illustrates the 799th and 800th counted pulse of a preceding counting cycle and the first and second counted pulses G of a following counting cycle. The clock pulses G* illustrate the output pulses of the clock pulse generator 26 having for example a frequency of 10kHz. A phase shift of about one pulse width may be provided between the clock pulses G* and the counted pulses G. The output pulse K* of the polarity sensor 95 signifies the polarity of the output of comparator 25.

The pause pulses P are generated by the pause clock pulses G*. The pause clock pulse generator 94 delivers the pause clock pulses $P_1$ corresponding to the encoding ($2^0$), $P_2$ corresponding to ($2^1$), $P_3$ to ($2^2$) and $P_4$ to ($2^3$). The pause locking pulse W is determined by the counting of 10 pulses and in turn determines the pause duration making certain that the storing of the information is accomplished during the respective pause in response to the storing instruction (memory pulse) S. The storing instruction or memory pulse S is derived from the pulses counted in counter 101 and evaluated in the NAND-gates 93 see FIG. 10.

The timing of the time multiplexing is controlled by the pulse signal U derived from the multiplex counter 100 in the multiplex clock 92, see FIGS. 6 and 10. The inverted signal $\overline{U}$ (FIG. 9) is supplied to the multiplex control 91 for the purpose of preventing the shifting of the counter 100 by a carry signal at the time of the application of the inverted signal S to the multiplex control 91 whereby S shifts the counter 100 to be ready for the next measured value.

Although the invention has been described with reference to specific example embodiments, it is to be understood, that it is intended to cover all modifications and equivalents within the scope of the appended claims.

What is claimed is:

1. A circuit arrangement for the digital display of unbalance representing analog input signals derived from a rotor rotating at a given rpm, comprising analog input signal distributor means for receiving said analog input signals, source means of reference signals, control circuit means, signal integrating means and polarity determining circuit means connecting said input signal distributor means to said control circuit means in that order, clock pulse generator means and counter means connected to said control circuit means to determine the duration of each signal integration by said integrating means for deriving digital signals corresponding to said analog input signals, a plurality of memory means, said control circuit means being connected to supply digital values corresponding to said digital signals to said memory means, a corresponding plurality of indicator units, means interconnecting each of said indicator units with a respective memory means, and constant display means connected to said control circuit means and to said indicator units, said constant display means including selector switch means for selecting a number of characteristic constant values to be displayed corresponding to the dimension of an unbalance, wherein said selector switch means provide a selectable switch position for each characteristic value, and wherein said constant display means comprise logic signal combining means connected to said selector switch means for combining the signals received from said selector switch means in accordance with said characteristic constant values, said logic signal combining means being further connected to receive control signals from said control circuit means to determine the storing of combined signals in said logic signal combining means, said logic signal combining means further comprising decoder means for decoding the combined signals, said decoder means being connected to said indicator units for determining the digital display of the unbalance representing signals with their respective units and the decimal point position.

2. The circuit arrangement according to claim 1, comprising further memory means connected between said signal combining means and said decoder means as well as to said control circuit means for storing signals determining the units and the decimal points.

3. The circuit arrangement according to claim 1, further comprising discriminator circuit means responsive to an exceeding of an adjusted measuring range by any signal or signal component to be displayed, and connected to said indicator units for displaying a further signal signifying said exceeding.

4. The circuit arrangement according to claim 3, wherein said selector swithc means include range selector switches connected through said control circuit means to said discriminator circuit means for automatically changing the display range in response to said further signal.

5. The circuit arrangement according to claim 1, comprising still further discriminator circuit means resonsive to a falling below of an adjusted measuring range by all unbalance representing signals to be displayed, and connected to said indicator units for displaying a still further signal signifying that the measured unbalance representing signals fall below the presently adjusted measuring range.

6. The circuit arrangement according to claim 1, wherein said indicator units are adapted for displaying the unbalance information as a vector size and its corresponding angular position, and further comprising signal suppressing circuit means responsive to a given vector size value and to the measured vector size value, said signal suppressing means being connected to respective ones of said indicator units (32c, 32d) for suppressing any angle display when the measured vector size value falls below said given vector size value.

7. The circuit arrangement according to claim 1, wherein said indicator units are adapted for displaying the unbalance information as a vector size and its corresponding angular position, and further comprising means responsive to a measured angular position for automatically recalculating the angular position to values between 0° to 359° when the measured angular position value is equal to or exceeds 360°.

8. The circuit arrangement or claim 1, wherein said indicator units further comprise means for displaying a dimensionless information.

9. The circuit arrangement of claim 1, wherein said constant display means further include attenuation adjustment means to adjust the magnitude of said unbalance representing analog input signals before application thereof to said input signal distributor means.

10. The circuit arrangement according to claim 1, further comprising means receiving measured rpm values from said rotor from which said unbalance representing signals are derived and circuit means operatively connected to said receiving means for digitally displaying a respective rpm.

11. The circuit arrangement according to claim 10, further comprising signal suppressing circuit means responsive to a given rpm signal value and the measured rpm representing signal values, as well as to the status of said memory means, said signal suppressing circuit means being connected to suppress any display in said indicator units when the actually measured rpm falls below said given rpm signal value and when said memory means are switched off.

12. The circuit arrangement according to claim 10, further comprising discriminating circuit means responsive to said given rpm signal value and to the measured rpm signal value, said discriminating circuit means being connected to at least one of said indicator units for displaying a signal signifying the exceeding or the falling below of said actual rmp value relative to the given rpm value.

13. The circuit arrangement according to claim 12, further comprising circuit means interconnecting said discriminating circuit means and at least one of said selector switch means for causing an automatic actuation of said selector switch means to change the rpm meausring range when said memory means are switched off.

14. A measuring system for indicating the unbalance of a rotating body, comprising sensor means for producing signals representing an unbalance, adjustable attenuator means connected to adjust said signals to produce adjusted signals with reference to given dimensions, a source of reference signals of a frequency related to the rotation rate of said rotating body, means logically combining said adjusted signals of said reference signals to produce analog signals related to the location and magnitude of an unbalance of said rotating body means converting said analog signals to digital coded signals, display means connected to display value corresponding to said coded signals, circuit means connected to said adjustable attenuator means for producing further digital signals corresponding to the settings of said attenuator means, and means for applying said further digital signals to said display means for displaying thereon the dimensions of said displayed values responsive to said coded signal.

* * * * *